Oct. 19, 1926.
L. J. NOETHER
1,603,489
FLEXIBLE JOINT STRUCTURE
Filed Nov. 24, 1924
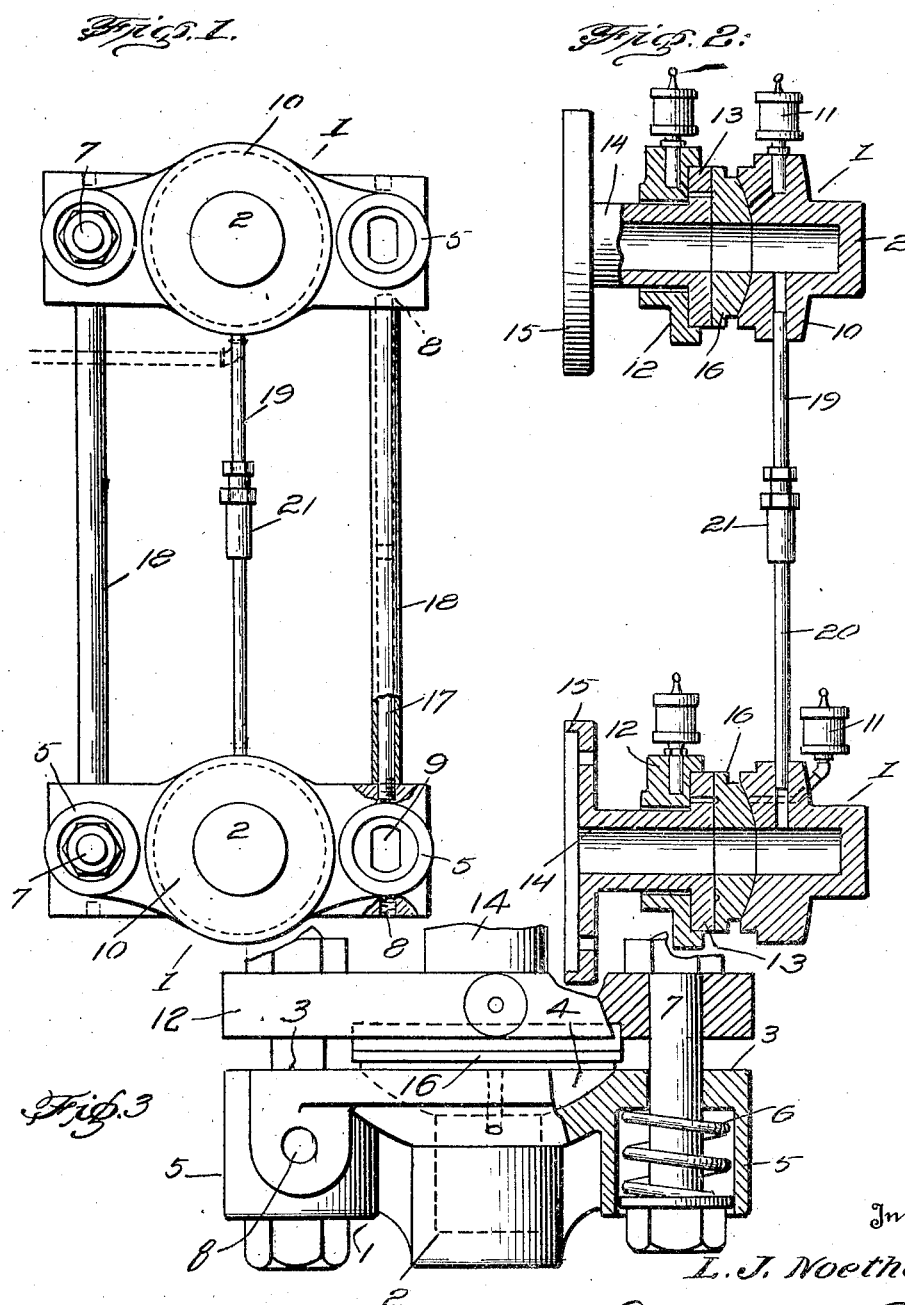
Inventor
L. J. Noether.

Patented Oct. 19, 1926.

1,603,489

UNITED STATES PATENT OFFICE.

LLOYD J. NOETHER, OF POTSDAM, NEW YORK.

FLEXIBLE JOINT STRUCTURE.

Application filed November 24, 1924. Serial No. 751,920.

This invention relates to an improved device, which has been especially designed for use in conjunction with fluid conducting calender rolls, and the present invention has more particular reference to an improved structure including a novel fluid conducting joint which is adapted for conveying the fluid from one roll to another.

Since calender rolls are ordinarily considered in superposed pairs, the present device may be conveniently and broadly referred to, as an improved circulation unit and joint structure for a pair of calender rolls.

In carrying out the invention, I employ a unit of this kind, which is composed of upper and lower flexible fluid conducting joints, connected together in a manner to permit relative vertical movement and to permit the fluid to be conveyed from one joint to the other.

It is my object to generally improve upon joints of this class, by providing one which is comparatively simple in construction, strong and durable, and such that it is exceedingly practical, for the work to which it is assigned.

Another object is to provide a joint of this kind which possesses a good degree of flexibility, by permitting free relative movement of the parts, yet maintaining fluid tight contact between the parts at all times.

Other features and advantages derived therefrom will become apparent from the following description and drawings.

In the accompanying drawings, forming a part of this application, and in which like numerals are employed to designate like parts throughout the same:

Figure 1 is an end elevation, partly in section, of a device constructed in accordance with this invention.

Figure 2 is a view, in section and elevation, taken at a right angle to Figure 1.

Figure 3 is a top plan view with portions shown in elevation and also in section, disclosing the specific construction of one of the joint structures.

As before stated, the improved structure may be broadly referred to as a fluid circulating unit. The unit comprises a pair of vertically spaced joint structures of identical construction. These joint structures are connected together, in a manner to permit relative vertical movement, and to compensate relative movement of the rolls, to which the joint structures are respectively connected. A pipe connection exists between the joint structures, to conduct fluid from one to the other.

Specifically described, each joint structure comprises a specially designed body 1, which constitutes the major detail of the joint. This body comprises a centrally disposed cup shaped portion 2, on opposite sides of which are extensions 3. On its inner face, the body is provided with a concavo-convex seat 4. At opposite ends, and extending laterally from the extension 3, are duplicate sockets 5, adapted to accommodate a coiled spring 6, surrounding a retaining bolt 7. At diametrically opposite sides of the sockets, the body is equipped with screw threaded holes 8, into which hereinafter described rods are threaded. As better seen in Figure 1, the body is provided in the bottoms of the sockets with elongated bolt openings 9. Also, as seen in Figure 2, the body is formed on one side of the part 2, with a bored boss 10.

At a point substantially diametrically opposite the bar 10 is an opening or passage into which the discharge pipe of the lubricant reservoir 11 is adapted to extend to provide a lubricant to the concavo-convex surface of the bore. Disposed in spaced parallelism with the body 1 and connected thereto for yielding movement through the medium of the bolts 7 is what may be defined as a collar 12. In the side opposed to the concavo-convex seat 4, the collar is provided with an annular recess, in which a flange 13 on a sleeve 14 is swivelled. The sleeve extends through and inwardly of the collar and is provided on its inner end with a discular and flanged attaching plate 15. The plate 15, in practice, is bolted or otherwise secured to one end of a calender roll. If desired, the collar 12 may be constructed to accommodate a lubricant containing reservoir or cup. Interposed between the flange 13 and the concavo-convex surface 4 is a centrally apertured disc 16, having a convex face fitting into the recess 4. This disc 16 is clamped tightly between the flange and body 1, through the medium of the bolts carried by the body and connected to the collar 12. As before stated, the joints are of duplicate formation, and therefore the same reference characters designate the same parts.

In forming the aforesaid fluid circulating unit two of the joints are arranged in the superposed relation seen in Figure 1, and a pair of short rods, 17, are tapped into the opposed sockets 8, and the inner ends of these rods are permitted to telescope into guide sleeves or tubes 18. Fluid passages or pipes 19 and 20 are connected to the joints respectively, through the medium of the bosses 10. The inner ends of the pipes 19 and 20 are connected together by a slidable joint or connection 21.

In practice, each joint structure is attached to one end of a hollow calender roll (not shown), through the medium of the attaching plate 15, rotation of the plate being permitted by the swivel connection of the flange 13, with the collar 12. Under some conditions, the superposed pair of calender rolls, to which the joint structures are connected, are compelled to move vertically with respect to each other, and this relative movement is permitted by the sliding connection between the superposed joint structures, and the parts of the joint structures themselves are permitted to move with respect to each other, in obvious directions, to maintain a tight fluid joint at all times, but permit the joint structures to accommodate the conditions existing.

Although I have shown and described the preferred embodiment of the invention, it is to be understood that minor changes coming within the field of invention claimed, may be resorted to, if desired.

While the invention has been described as being especially adapted for use with calender rolls, I wish to make it clear that it is not restricted to this particular use, for it may be used with various other kinds of fluid conducting rolls, and furthermore, while I have shown what may be termed a single unit composed of a pair of joint structures, I wish to make it known that in practice, a multiplicity of vertically spaced superposed rolls is frequently found. For this reason, each joint structure or the body portion thereof is constructed to permit another joint to be added on, as the conditions may require. In this connection I would direct attention to the fact that the sockets 8 are at both the top and bottom of the body of each joint structure. Thus, each body is reversible, and either side may be disposed up. This structure also makes for convenience of assembly. Furthermore, while it has not been shown, I would make it known that under some conditions, a flexible conduit may be employed for connecting two joint structures together; that is, a flexible pipe may be substituted for the extensible conduit provided by the parts 19 and 20.

I claim:

A device of the class described comprising a unit including a pair of vertically spaced superposed joint structures, each including a body and a plurality of relatively movable parts, slidably connected fluid conducting parts connected with the bodies, rods carried by said bodies, and tubes interposed between the bodies, the inner ends of said rods telescoping in said tubes to maintain the joint structures in proper relation.

In testimony whereof I affix my signature.

LLOYD J. NOETHER.